(12) United States Patent
Kaplan

(10) Patent No.: US 6,772,169 B2
(45) Date of Patent: Aug. 3, 2004

(54) SYSTEM, METHOD AND APPARATUS FOR THE WIRELESS MONITORING AND MANAGEMENT OF COMPUTER SYSTEMS

(75) Inventor: Ari David Kaplan, Chicago, IL (US)

(73) Assignee: Expand Beyond Corporation, Chicago, IL (US)

(*) Notice: Subject to any disclaimer, the term of this patent is extended or adjusted under 35 U.S.C. 154(b) by 63 days.

(21) Appl. No.: 09/964,912

(22) Filed: Sep. 27, 2001

(65) Prior Publication Data

US 2002/0095427 A1 Jul. 18, 2002

Related U.S. Application Data

(60) Provisional application No. 60/247,523, filed on Nov. 9, 2000.

(51) Int. Cl.[7] ............................................... G06F 17/30
(52) U.S. Cl. ....................................... 707/102; 707/101
(58) Field of Search .................. 342/357.09; 455/412.2, 455/517; 600/545; 701/1, 200; 705/44; 709/217; 707/101, 102, 104.1

(56) References Cited

U.S. PATENT DOCUMENTS 6,005,561 A 12/1999 Hawkins et al.
6,097,336 A 8/2000 Stilp
6,405,123 B1 * 6/2002 Rennard et al. ............ 701/200
6,473,609 B1 * 10/2002 Schwartz et al. ........... 455/406
6,516,203 B1 * 2/2003 Enzmann et al. ........ 455/556.1

OTHER PUBLICATIONS

PCT International Search Report prepared by the U.S. Receiving Office, mailed on Apr. 2, 2002.
PCT International Preliminary Examination Report prepared by the U.S. Patent & Trademark Office, mailed on Sep. 4, 2002.

* cited by examiner

Primary Examiner—Diane D. Mizrahi
Assistant Examiner—Apu M Mofiz
(74) Attorney, Agent, or Firm—Gardner Carton & Douglas LLP

(57) ABSTRACT

A system, a method and an apparatus are provided for the wireless monitoring and management of computer systems, networks, software systems or databases on a portable and/or handheld device which may monitor, update, and fix the system from any location and at any time. More specifically, the system, the method and the apparatus provide for the wireless monitoring and management of such systems by formatting information on a handheld screen of a wireless device, automatically wrapping portions of information for browsing on wireless devices, displaying information in a graph or other format on a wireless device, and/or auto-scaling of graphs on a wireless device.

46 Claims, 2 Drawing Sheets

SYSTEM, METHOD AND APPARATUS FOR THE WIRELESS MONITORING AND MANAGEMENT OF COMPUTER SYSTEMS

This application claims the benefit of U.S. Provisional Application Serial No. 60/247,523, filed Nov. 9, 2000.

FIELD OF THE INVENTION

The present invention generally relates to a system, a method and an apparatus for the wireless monitoring and management of computer, software and database systems. More specifically, the present invention provides a portable wireless monitoring and management tool that may be used remotely by a database or system administrator.

BACKGROUND OF THE INVENTION

With the proliferation of computer systems and networks to carry out and support many of the activities and communications of modern businesses, a failure of a computer system, software system, network or database may result in extremely extensive downtime which translates into lost revenue and often includes bad publicity. For example, if a network, software system or database application of a bank were impaired, then certain or all financial transactions of the bank may not be able to process until such systems or applications are operable and/or functioning. A need exists to reduce software, network and database failure rates and downtimes while increasing performance and operational efficiency.

Traditionally, software, network and database monitoring and/or management has been confined to hard-wired environments where system administrators or database administrators (DBAs) must be physically present and available at all times in the event that a problem or situation occurs that requires human intervention to fix and correct. For many companies, a system administrator or a DBA employed or utilized by the company on a full time basis is extremely costly. For other companies, recruiting, training and maintaining a staff of system administrators or DBAs is simply not an economically viable option.

The present invention overcomes these deficiencies and limitations of prior techniques by allowing for system, network and/or database monitoring and management from portable handheld wireless devices.

The present invention allows monitoring and maintaining of computer systems, networks and databases using portable, handheld, wireless devices. As a result, system administrators, network administrators and DBAs may be freed from the constraints of their home and office computers and may monitor, update, and fix computer and software systems, networks and databases from any location and at any time. The present invention, therefore, provides an important advantage in a competitive global economy where companies cannot afford lengthy software, network or database failures or downtime, or inadequate response time to address such failures.

However, despite the flexibility provided by wireless devices, such devices introduce a number of different challenges due to their portable and wireless environment. Such challenges include limitations related to transmission and receiving speed (limited by available wireless bandwidth), the periodic loss of signal, reduced device size and reduced display size, and unique security concerns caused by the wireless environment. In addition, for handheld wireless devices, limitations exist regarding data entry; namely, handheld wireless devices typically do not include keyboards, and text may require entering through handwriting and/or other techniques.

A need, therefore, exists for an improved system, method and apparatus for the monitoring and management of computer systems, software systems, networks and databases. In addition, a need exists to reduce failure rates and downtimes while increasing performance and operational efficiency of such systems.

SUMMARY OF THE INVENTION

The present invention provides a system, a method and an apparatus for the wireless monitoring and management of computer systems, software systems, networks and databases.

To this end, in an embodiment of the present invention, a method is provided for the wireless monitoring and management of such systems where information is displayed on a wireless device. The method comprises the steps of: formatting information on a screen of the wireless device by wrapping portions of data sets; browsing on the wireless device between portions of data sets; displaying system or database information in a predetermined format on the wireless device; and scaling the information in the predetermined format on the wireless device.

In another embodiment of the present invention, a method is provided for formatting results on a screen of a wireless device. The method comprises the steps of: querying data records from a database; anticipating a number of the data records to be retrieved from the database; retrieving the data records from the database; storing the data records on a web or application server; choosing a threshold number; determining if the data records retrieved from the database is greater than the threshold number; and displaying the data records on the wireless device.

In an embodiment, the method displays the data records not greater than the threshold number on a single screen of the wireless device.

In an embodiment, the method comprises the steps of: breaking data records into portions; wrapping each of the portions; and providing a display area on the screen of the wireless device for each of the portions of data records that has been wrapped.

In an embodiment, the method determines a number of data records in each of the portions.

In an embodiment, the method navigates among each of the portions of data records.

In an embodiment, the method encloses the display area in a solid box. In an embodiment, the method further comprises the steps of: calculating a width in pixels of text in each data record; computing a sum of the pixels; calculating a width in pixels of a field in the display area; entering the text on a first line of the field to the extent of the width in pixels of the text allowed in the width in pixels of the field in the display area; and entering the text on a second line of the field to the extent of the width in pixels of the text allowed in the width in pixels of the field in the display area.

In an embodiment, the method comprises the step of highlighting text from the data records within the display area.

In an embodiment, the method inputs retrieved data into a graphing program, displays the data in a graph; and displays the data on an axis. The graph may be a bar-chart, a pie-chart, or the like.

In another embodiment of the present invention, a method is provided for formatting results on a screen of a wireless device by breaking columns in a table. The method comprises the steps of: comparing columns of text in the table; determining how many columns to display horizontally to provide a best visual perception; determining a width of each of the columns to display; and choosing break points in the table.

In an embodiment, the method breaks columns in a table is further comprised of the step of breaking columns with identical text by displaying the identical text on one line of the table.

In an embodiment, the method highlights the text of the table. In an embodiment, the method compares a display order of data and a frequency of repetition for the columns in the table.

In another embodiment of the present invention, a method is provided for formatting data records on a screen of a wireless device by using a scroll mechanism associated with the wireless device. The method comprises of the steps of: shifting each of the data records on the screen; keeping each of the data records together on the screen; and locking one of the data records while shifting the remaining data records on the screen associated with the wireless device.

In an embodiment, the method highlights a selection of the data records.

In yet another embodiment of the present invention, a system is provided for the monitoring and management of databases. The system has a wireless device having a screen and a wrapping means. The system also has a web server associated with the database wherein the wireless device remotely accesses the database.

In another embodiment of the present invention, a system is provided for formatting data query results stored in a database wherein the database has text of data defined by a plurality of characters wherein each of the plurality of characters is defined by a number of pixels. The system has a wireless device having means for retrieving data query results. The system has an application and/or web server having a memory associated with the application/web server wherein the server has a means for remotely accessing the text data associated with the database and transferring the text of data to the wireless device.

In another embodiment of the present invention, a system is provided for formatting results on a screen of a wireless device. The system has a database with text of data defined by tables having columns and an application or web server in remote communication with the wireless device. The server determines a width of each of the columns, chooses columns with identical text and breaks columns with identical text.

In an embodiment, the system has a means for highlighting the text of data.

In an embodiment, the system has a means for comparing a display order of the text of data and means for comparing a frequency of repetition for the columns in the table of the text of data.

In yet another embodiment of the present invention, a system is provided for formatting data records on a wireless device. The system has a screen and a scrolling mechanism. The scrolling mechanism may shift the data records on the screen. The scrolling mechanism keeps each of the data records together. The scrolling mechanism further locks one of the data records while shifting a remainder of the data records on the screen.

In an embodiment, the system has a means for highlighting the data records.

In another embodiment of the present invention, an apparatus is provided for monitoring and management of a database. The apparatus has a wireless means providing remote access to an application or web server, queries data records from the server wherein the application or web server is associated with the database and further wherein the wireless means anticipates a number of data records to be retrieved from a database, means for choosing a threshold number, means for retrieving the data records from the database, means for comparing a number of the retrieved data records retrieved to the threshold number, and means for displaying the data records in a predetermined format wherein the means for displaying is associated with the wireless means.

In an embodiment, the apparatus has a means for highlighting the data records.

In an embodiment, the apparatus has a means for navigating between each of the data records.

It is, therefore, an advantage of the present invention to provide a system, an apparatus and a method that reduces downtime. To this end, application and database downtime is dramatically reduced. To fix a system, network or database problem, system administrators or DBAs do not spend critical time driving to a fixed location such as to home or to work, booting up a computer, or dialing-in to a server or ISP.

Another advantage of the present invention is to provide a system, an apparatus and a method that significantly reduces analysis and troubleshooting time. This time is particularly important for mission-critical systems. The system, apparatus and method of the present invention provide the tools to readily identify troubleshooting issues.

Another advantage of the present invention is to provide a system, an apparatus and a method that reduces DBA staff burnout. Staff no longer needs to completely interrupt a weekend or weeknight for minor issues when they can monitor and troubleshoot issues from anywhere using the system, the apparatus and the method of the present invention.

Yet another advantage of the present invention is to provide a system, an apparatus and a method that increases confidence in management. Managers may rest easier knowing that their staff has complete and immediate access to their software systems, networks and/or databases from any location at any time.

Further, another advantage of the present invention is to provide a system, an apparatus and a method that allows for monitoring multiple databases, systems or networks from one console.

Still further, another advantage of the present invention is to provide a system, an apparatus and a method that improve the productivity and manageability of the DBA staff.

Yet another advantage of the present invention is to provide a system, an apparatus and a method that reduce the learning curve of new DBAs when they start a job.

Another advantage of the present invention is to provide a system, an apparatus and a method that reduce or eliminate the need for custom-written scripts that are common among the database communities, such as, for example, a database community using a database management tool provided by, for example, the Oracle Corporation.

Additional features and advantages of the present invention are described in, and will be apparent from, the detailed description of the presently preferred embodiments and from the drawings.

DETAILED DESCRIPTION OF THE INVENTION

Figure 1:
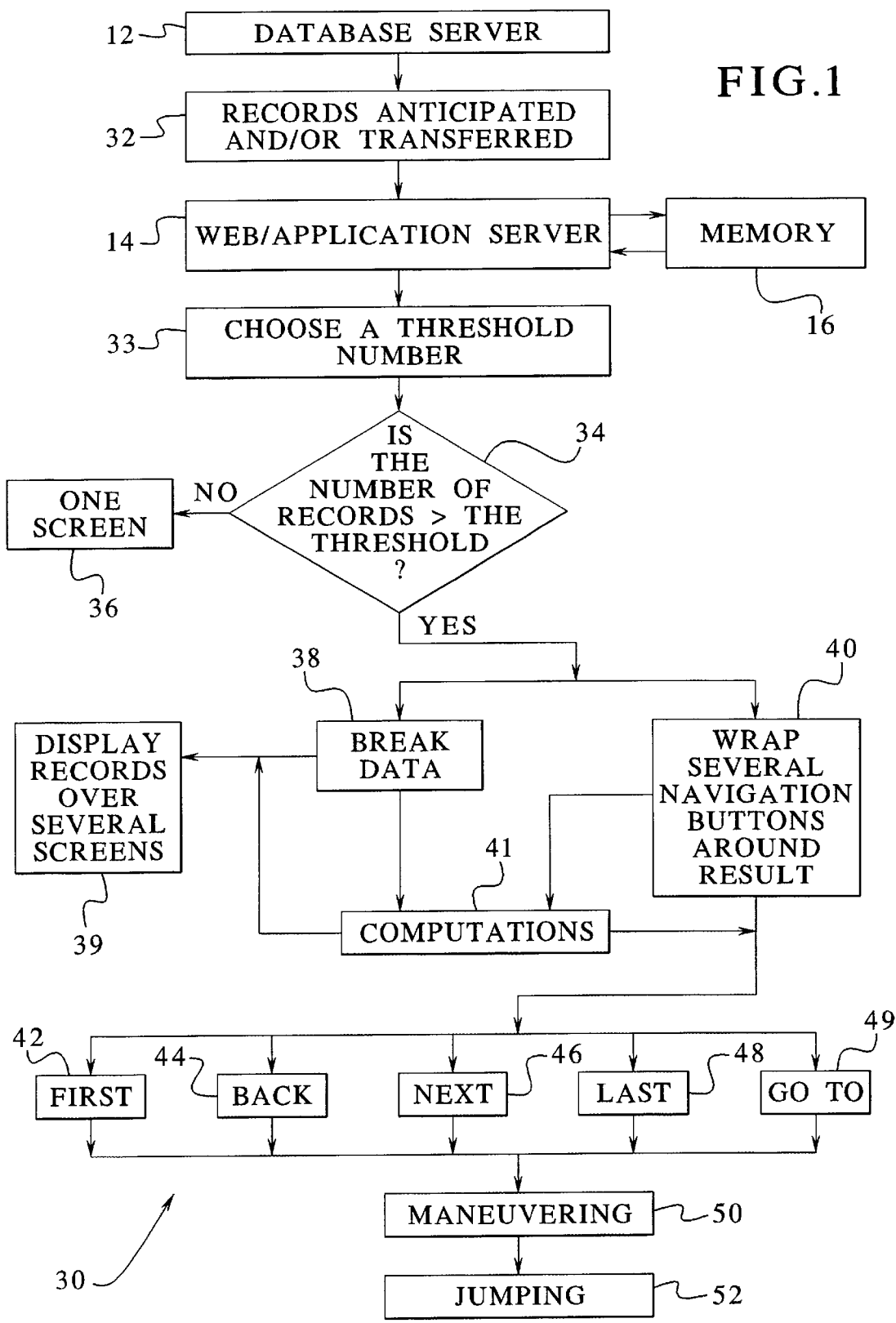
FIG. 1 illustrates a flowchart for retrieval of data from a database and determination of whether the number of records exceeds the threshold for wrapping in an embodiment of the present invention.

The following description provides, by way of example, an implementation of the advantageous concepts and techniques of the present invention in connection with a system and methods for the wireless monitoring and management of databases. It should be understood, however, that the concepts and techniques may be readily implemented with respect to other similar systems, such as a computer system, software system or network. The advantages of the present invention will be similarly realized for such other systems.

Merely by way of example, the following description relates to one particular embodiment or application of the present invention for database monitoring and management. It is not intended to limit the invention to such an embodiment or application. To the contrary, it is intended that the invention covers all variations, equivalents and embodiments embraced by the scope and spirit of the appended claims.

According to one preferred embodiment, the present invention generally provides a system, a method and an apparatus for the wireless monitoring and management of databases. To this end, the present invention provides a system, a method and an apparatus for formatting results on a handheld screen. In addition, the present invention provides a system, a method and a apparatus for automatically wrapping portions of data sets for browsing on wireless devices. Further, the present invention provides a system, a method and an apparatus for displaying database information in a graph on a wireless device. Still further, the present invention provides a system, a method and an apparatus for auto-scaling of graphs on a wireless device.

To format results on a handheld and/or portable and/or wireless screen (hereinafter "screen"), displaying the results of a database query is provided on a desktop computer as ample space is provided to display many columns and records of data. However, the size of the screen is generally several times smaller. When using databases such as, for example, the database for desktop computers by Oracle Corporation, all data is displayed on one line for each record as follows:

| Heading 1 | Heading2 | Heading3 | Heading4 | Heading5 |
|---|---|---|---|---|
| Record1__column1 | rec1__Col2 | rec1__Col3 | rec1__Col4 | rec1__Col5 |
| Record2__column1 | rec2__Col2 | rec2__Col3 | rec2__Col4 | rec2__Col5 |
| Record3__column1 | rec3__Col2 | rec3__Col3 | rec3__Col4 | rec3__Col5 |

In the example above, text is not wrapped within each column as the text is sometimes cutoff: LONG data types are cutoff to 80 characters by default, and if the total line size is larger than the LINESIZE value (defaulted to 80 characters), then the heading and record displays are wrapped on 2, 3, 4 or more lines. To complicate matters, if the PAGESIZE value is greater than 0 (the default is 12), then the heading repeats within each PAGESIZE increment, making text difficult to read. A sample Oracle output of the query "SELECT OWNER, TABLE_NAME, TABLESPACE_NAME, PCT_FREE, PCT_USED, INITAL_EXTENT, NEXT_EXTENT, MIN_EXTENTS, MAX_EXTENTS, PCT_INCREASE FROM ALL_TABLES" is shown as follows:

| OWNER | TABLE_NAME | TABLESPACE_NAME | PCT_FREE | PCT_USED |
|---|---|---|---|---|
| INITIAL_EXTENT | NEXT_EXTENT | MIN_EXTENTS | MAX_EXTENTS | PCT_INCREASE |
| SYSTEM | EMPLOYEES | SYSTEM | 10 | 90 |
| 11241 | 4096 | 1 | 255 | 0 |

However, the system, the method and the apparatus of the present invention may display data aligned and/or enclosed in clearly delineated boxes. The same difficult-to-read results from a database, such as, for example, the Oracle database described above, may be displayed on the apparatus of the present invention such that the displaying data is shown as follows:

TABLE

"SYSTEM.EMPLOYEES" has the following storage:

| Initial Pct Used Extents | Next Pct Free Min Extents | % Increase Tablespace Max Extents |
|---|---|---|
| 31241 | 4096 | 0 |
| 90 | 10 | SYSTEM |
| 17 | 1 | 255 |

As seen from the above table, according to an embodiment of the invention, some field headings may be advantageously changed to shorter and more meaningful names. For example, instead of having a field heading of "PCT_INCREASE", the system has changed the field heading to "% Increase". Such a change, results in not only a more meaningful field heading, but also reduces the size required by two characters. Such a revision of the field names may be accomplished by any number of routines for recognizing field names or portions of field names and renaming them in a manner which is more likely desired by the user. As another different example, for information having a column heading "How Many Shares Have Been Traded Today on Wall Street", the heading may be more conveniently changed to a shorter and more meaningful name for a user on a wireless device such as "Shares Traded Today."

The present invention provides for display of data that may be more visually understandable and that may be displayed on smaller screen areas. By the system and the method of the present invention, text may be wrapped within each display area and may be enclosed by a solid box. Additionally, bold text may be used to represent the heading information (indicated by the "Initial" through "Max Extents" in the table above, identified as "SYSTEM.EMPLOYEES". The use of bold text may provide better visual perception for the user to, for example, differentiate between headings and/or displayed data.

Wrapping of text may be based upon calculations of a width in pixels of each letter, number, and/or character. This calculation may identify the width of the field and may compute the sum of pixels until the line is filled. The calculation may continue on the next line until the next line is filled, and so on.

In known systems, wrapping occurs as part of the inherent operating systems. Therefore, wrapping is not handled by handheld operating systems; however, in an embodiment of the present invention, text may be wrapped within each box of each column. For example, the word "Product_ID" may have eight pixels across the "P", six pixels for "r", six pixels for "o", five pixels for "d", six pixels for "u", five pixels for "c", five pixels for "t", six pixels for "_", five pixels for "I", and five pixels for "D". A total of 57 pixels, is therefore, required to display "Product_ID". If the box that contains "Product_ID" has fewer than 57 pixels, then, in an embodiment of the present invention, the displayed data may break into two or more lines. For example, assume that the box that contains "Product_ID" is 50 pixels across. The first line may hold "product" and "_" which totals 47 pixels. The "ID" which totals ten pixels may be displayed on the second line within the box, and the box may be extended vertically by one line. When one box for a line of the display is expanded vertically, then all of the boxes on the line are similarly enlarged vertically. Wrapping of text within a box is shown as follows:

| COLUMN | TABLE | |
|---|---|---|
| PRODUCT_ID | PRODUCT | ↕ 2 lines high |
| EMP_ID | EMP | ↕ 1 line high |

<------------>
47 pixels

In another embodiment of the present invention, all data may be displayed by using a "break" column. The conventional method is to simply display all data for all rows. In an embodiment of the present invention, a "break" column may allow for more columns to be displayed in an easily understood format. For example, if a table has four columns, and the first column has some repeating values in the data, the conventional method is to simply display all data. For example, the results of a query that displays information on the makeup of a conventional method such as, for example, Oracle indexes, is shown as follows, with displaying all four columns formatted: SELECT INDEX_OWNER, INDEX_NAME, COLUMN_NAME, COLUMN_POSITION FROM ALL_ID_COLUMNS ORDER BY 1, 2, 4;

| OWNER | TABLE | COLUMN | POS |
|---|---|---|---|
| DEMO | I_ITEM | ORDER_ID | 1 |
| DEMO | I_ITEM | ITEM_ID | 2 |
| DEMO | I_ITEM | EMP_ID | 3 |
| DEMO | I_LOCATION | LOCATION_ID | 1 |
| DEMO | I_PRICE | PRODUCT_ID | 1 |
| DEMO | I_PRICE | START_DATE | 2 |
| DEMO | I_PRODUCT$PRODUCT_ID | PRODUCT_ID | 1 |

In an embodiment of the present invention, the display may "break" the information on the first column more effectively. That is, display of the first column may be provided on one line and may be followed by the rest of the columns in the record. All subsequent records with the same first column value may then be displayed. In situations where two columns with repeating values exist, screens may have two columns as their break points. Having at least one column as a breakpoint may effectively reduce the width of the display by one column which is valuable on a small screen. The same information from the previous illustration is shown with the concept of "breaking" on the first column as provided by the present invention by displaying four columns with "owner" as the break column as follows:

| TABLE | -OWNER- COLUMN | POS |
|---|---|---|
| | -DEMO- | |
| I_ITEM | ORDER_ID | 1 |
| I_ITEM | ITEM_ID | 2 |
| I_ITEM | EMP_ID | 3 |
| I_LOCATION | LOCATION_ID | 1 |
| I_PRICE | PRODUCT_ID | 1 |
| I_PRICE | START_DATE | 2 |
| I_PRODUCT$ PRODUCT_ID | PRODUCT_ID | 1 |

By "breaking" on the first column ("owner" in the above example), the area needed to display the information is approximately 25% smaller. All information, however, may still be displayed. Further "breaking" of this data into a smaller size may also be possible. For example, if the first two columns ("owner" and "table" in the above example) are used as break points, only the remaining information may need to be repeated for each set of break points ("owner" and "table"). In addition, having two break points does not necessarily mean that the break points may be in separate boxes when displayed. The break points may be formatted to be displayed within one box, such as shown, for example, in the following table. The table illustrates breaking of "owner" and "table". The "owner" and "table" are placed in one box, separated with a period and surrounded with dashes for better visual perception. As shown in the following table for displaying four columns with "owner" and "table" as the two break columns:

| -OWNER TABLE- | |
|---|---|
| COLUMN | POS |
| -DEMO.I_ITEM- | |
| ORDER_ID | 1 |
| ITEM_ID | 2 |
| EMP_ID | 3 |
| -DEMO.I_LOCATION- | |
| LOCATION_ID | 1 |
| -DEMO.I_PRICE- | |
| PRODUCT_ID | 1 |
| START_DATE | 2 |
| -DEMO.I PRODUCT$PRODUCT_ID- | |
| PRODUCT_ID | 1 |

As seen in the above table, the display of data may be reduced from the initial four columns to only two columns and, as a result, improves the visual perception of the data. In the system of the present invention, each screen may have predetermined column positions and break points. An additional example is shown in the table below for displaying six columns from, for example, a result of a query with "owner" and "tablename" as the two break columns:

| -Owner.TableName- | |
|---|---|
| Constraint Condition | Type Status |
| TAL.MDR_TRADES_QUOTES_TIME_SUM_T- | |
| SYS_C00997 | C |
| "TRANS_FEE_CODE" IS NOT NULL | DISABLED |
| SYS_C00998 | C |
| REC_DEL_IN ('Y','N') | ENABLED |
| SYS_C00999 | C |
| REC_DEL_IND NOT NULL | ENABLED |
| -TAL.TRADE-DATE-T- | |
| TRADE_DATE-PK | ENABLED |

Displaying the information from the table above without break points would have been more cluttered such as shown in the following table that displays six columns with no break points as follows:

| Owner Type | Tablename Condition | Constraint Status |
|---|---|---|
| TAL | MDR_TRADES_QUOTES_TIME_SUM | SYS_C00997 |
| C | "TRANS_FEE_CODE" IS NOT NULL | DISABLED |
| TAL | MDR_TRADES_QUOTES_TIME_SUM | SYS_C00998 |
| C | REC_DEL_IND IN ('Y','N') | ENABLED |
| TAL | MDR_TRADES_QUOTES_TIME_SUM | SYS_C00999 |
| C | REC_DEL_IND NOT NULL | ENABLED |
| TAL P | TRADE_DATE_T | TRADE_DATE_PK ENABLED |

The present invention may determine which columns (if any) are the break points. To this end, the present invention may identify the columns of data, the display order of the data, and/or the frequency of repetition for the ordered columns. From an identification of one or more of these values, a decision may be made to use break columns or not to use break columns. The present invention may also determine how many columns to display horizontally to provide the best visual perception for the user. In addition, the present invention may determine the width of each column to display. For example, the display in the previous table may be compacted visually by reducing the width of the first column and the third column. The following table shows the display of six columns with no break columns to reduce the width of the first column and the third column:

| Owner Type | Tablename Condition | Constraint Status |
|---|---|---|
| TAL | MDR_TRADES_QUOTES_TIME_SUM | SYS_C00997 |
| C | "TRANS_FEE_CODE" IS NOT NULL | DISABLED |

-continued

| Owner Type | Tablename Condition | Constraint Status |
|---|---|---|
| TAL | MDR_TRADES_QUOTES_TIME_SUM | SYS_C00998 |
| C | REC_DEL_IND IN ('Y','N') | ENABLED |
| TAL | MDR_TRADES_QUOTES_TIME_SUM | SYS_C00999 |
| C | REC_DEL_IND NOT NULL | ENABLED |
| TAL P | TRADE_DATE_T | TRADE_DATE_PK ENABLED |

A limitation for viewing information is that when the information is larger than one screen size, a scroll bar is used to move the focus of the screen up or down. The scroll bar is similar to those scroll bars used with desktop computer software, such as word processors or Internet browsers. When using a scroll bar, the entire screen may be shifted up or down. As a result, the headings for the columns may scroll off of the screen.

As shown in the following table, the loss of viewing of header information after scrolling down is illustrated as follows:

| TAL | MDR_TRADES_QUOTES_TIME_SUM | SYS_C00997 |
|---|---|---|
| C | "TRANS_FEE_CODE" IS NOT NULL | DISABLED |
| TAL | MDR_TRADES_QUOTES_TIME_SUM | SYS_C00998 |
| C | REC_DEL_IND IN ('Y', 'N') | ENABLED |
| TAL | MDR_TRADES_QUOTES_TIME_SUM | SYS_C00999 |
| C | REC_DEL_IND NOT NULL | ENABLED |
| TAL | TRADE_DATE_T | TRADE_DATE_PK |
| P | | ENABLED |
| FRED | MDR_TRADES_QUOTES_TIME_SUM2 | SYS_C01003 |
| C | "TRANS_FEE_CODE" IS NOT NULL | ENABLED |

As shown by the above table, the heading information is not viewable which may cause difficulty in interpreting the data. In an embodiment of the present invention, the scrolling may be improved by the header information being held on the top of the screen while the user scrolls up or down. The data below the heading may shift while the header information always stays at the top of the screen. As a result, the visual perception of the user may be improved.

The effect of scrolling to the end of a data set, while the header remains at the top of the screen, is shown in the following table where header information may be maintained after scrolling down two lines (one record) as follows:

| Owner Type | Tablename Condition | Constraint Status |
|---|---|---|
| TAL | TRADE_DATE_T | TRADE_DATE_PK |
| P | | ENABLED |
| FRED | MDR_TRADES_QUOTES_TIME_SUM2 | SYS_C01003 |
| C | "TRANS_FEE_CODE" IS NOT NULL | ENABLED |
| FRED | EMP | EMP_PK |
| P | | ENABLED |
| FRED | EMP_SALARY | SYS_C01006 |
| C | "SALARY" IS NOT NULL | ENABLED |
| FRED | DEPT | EMP_PK |

Note that in the above table, the last line ("FRED", "DEPT", "EMP_PK") refers only to the "owner", "tablename", and "constraint" fields of the data. The "type", "condition", and "status" fields are not shown. This result is due to the screen scrolling only by one line at a time that results in only one of the two lines for a record being displayed. In an embodiment of the present invention, a further improvement of the existing process for monitoring and management of databases, may be to scroll up and/or down an entire record using the scroll bars. For example, if a record spans two lines, as in the table above, then using the scroll bars may move the entire record, i.e. two lines, up and down. In the table above, only one line at a time was moved. The effects of scrolling one record at a time are shown in the following table. In the table below, header information and complete records may be maintained after scrolling down, and the records are not split off of the screen at the bottom as shown as follows:

| Owner Type | Tablename Condition | Constraint Status |
|---|---|---|
| TAL | TRADE_DATE_T | TRADE_DATE_PK |
| P | | ENABLED |
| FRED | MDR_TRADES_QUOTES_TIME_SUM2 | SYS_C01003 |
| C | "TRANS_FEE_CODE" IS NOT NULL | ENABLED |
| FRED | EMP | EMP_PK |
| P | | ENABLED |
| FRED | EMP_SALARY | SYS_C01006 |
| C | "SALARY" IS NOT NULL | ENABLED |
| FRED | DEPT | EMP_PK |
| P | | ENABLED |

In addition to the foregoing, color coding of records, fields, and/or borders may further enhance visual perception particularly in environments in which color is important. For example, all of the heading fields may be displayed in green, and all of the data fields may be displayed in white. Another example may be that all of the "owner" data fields and the "owner" heading may be in blue while all of the other data may be yellow. By displaying data in varying colors, the data information may be easier to perceive and/or to interpret by the user.

In an embodiment of the present invention, portions of data sets for browsing on wireless devices may be automatically wrapped. Due to the conventional nature of querying databases, many results return a significant amount of data. For example, a query of all objects in a database may return hundreds or even thousands of records. The amount of time to transmit this information over a wireless device is generally prohibitive. Also, a limit on the amount of data retrieved in a single call by a wireless device, which is not a limit on non-wireless-based products, typically exists. This limit cuts-off any additional data received that may possibly cause errors in the received data. To avoid this issue, the system and method of the present invention wraps the data.

Referring now to the drawings wherein like numerals refer to like parts, FIG. 1 illustrates a flowchart of an embodiment of various methods incorporated by the apparatus and/or system of the present invention. The flowchart illustrates retrieval of data from a database and determination if the number of records exceeds the threshold for wrapping 30. A large number of records may be anticipated and/or may be transferred 32 from a database or server 12 to a web or application server 14. The data may be retrieved from the database server 12 and may be stored in a memory 16 associated with the web or application server 14.

A program resident on a web or application server 14 may choose a threshold number as identified at step 33. A threshold number of records may be established. For example, the threshold may be thirty records. Of course, a determination as to another number of records that may be more optimal based upon the size of the records may be made. The program resident on the web or application server 14 may determine whether or not a result set is significantly large to the user such that one screen 36 is ineffective to display, as shown in step 34.

As will be apparent to one of skill in the art, the screen size will vary from one particular wireless device to another. In a preferred embodiment, upon connection of a wireless device to the database server, various hardware and firmware parameters will be available or determined, either from a set of predetermined variables, or based upon pre-existing information corresponding to the type of wireless device being used. In any event, since the system of the invention preferably knows the size of the screen of the wireless device, the system can determine in step 34, for example, whether the information needs to be broken down into several different screens or if the information may be displayed on just a single screen (as illustrated in step 36).

If the result set is too large such that one screen 36 is ineffective to display the result set, the data may break into several portions 38 and/or may wrap several navigation buttons around the result 40. The records may be displayed such that several sets of records are spread out over several screens. The buttons may be implemented to assist the user in navigating among the set of records by using the "first" 42, "back" 44, "next" 46, or "last" 48 commands. In addition, there may be provided a "go to" button 49 that allows the user to jump to a specific record directly. The result set of the query may be wrapped around the "first" 42, "back" 44, "next" 46, "last" 48 or "go to" 49 buttons. The buttons may control going to the first set of thirty records, the previous set of thirty records, the next set of thirty records, and the final set of thirty records, for example, or in the case of the "go to" button would allow the user to jump to a specific record directly. This is shown in the following table where a set of data may be wrapped using "first" 42, "back" 44, "next" 46, "last" 48 or "go to" 49 buttons.

| <First><Back><Next><Last><Go To> | |
|---|---|
| OWNER | TABLE_NAME |
| SCOTT | EMP |
| SCOTT | DEPT |
| SCOTT | INVENTORY |
| ... | ... |

The user may scroll through thirty (or the threshold predetermined for each screen by the web or application server) records. Selecting "First" 42 may bring up the first thirty records. Selecting "Back" 44 may retrieve the previous thirty records in the set. Selecting "Next" 46 may retrieve the next thirty records in the set. Selecting "Last" 48 may bring up the last thirty records (or portion thereof) in the set. Selecting "Go To" 49 would prompt the user to input a particular record number which, when entered, begins the display with the particular record number entered.

An alternative to the "First" 42, "Back" 44, "Next" 46, or "Last" 48 may be through other words or graphics, as shown in the following table where sets of data may be wrapped using "first", "back", "next", "last" or "go to" icon buttons.

| OWNER | TABLE_NAME |
|---|---|
| SCOTT | EMP |
| SCOTT | DEPT |
| SCOTT | INVENTORY |
| ... | ... |

Computations 41 may be made to determine which sets of records are contained in the last screen. For example, if there are 43 records, then the first set may contain records 1–30. The last set may contain records 31–43.

The present invention may also allow for maneuvering, as identified at a step 50 in FIG. 1, among the sets of 30 (or the threshold) records by jumping, as shown at a step 52, directly to a particular set. Jumping 52 directly to a particular set may be accomplished by the display of numbers representing a set of data. The following table illustrates wrapping of sets of data using numbered buttons to jump among sets.

Jump to Set:

| <Previous> 1 2 3 4 5 6 7 8 9 10 <Next> | |
|---|---|
| OWNER | TABLE_NAME |
| SCOTT | EMP |
| SCOTT | DEPT |
| SCOTT | INVENTORY |
| ... | ... |

In another embodiment of the present invention, the number of records in each set may be determined and/or the number of sets to display may be determined. In the table above, ten sets may be displayed. Clicking on "Previous" may go to the previous ten sets, and clicking on "Next" may go to the next ten sets.

Between screens, session information may be stored on the system of the user that issued the query. Also, pointers may be maintained to the record that the user last requested which maintains to which set of thirty records is currently pointed, and enables the web or application server 14 to move among the sets of thirty records. Also, in the event that the session times out, the user must re-enter his or her password. However, the present invention may allow use of the current set of information without having to re-query or retrieve all data from the database an additional time.

Figure 2:
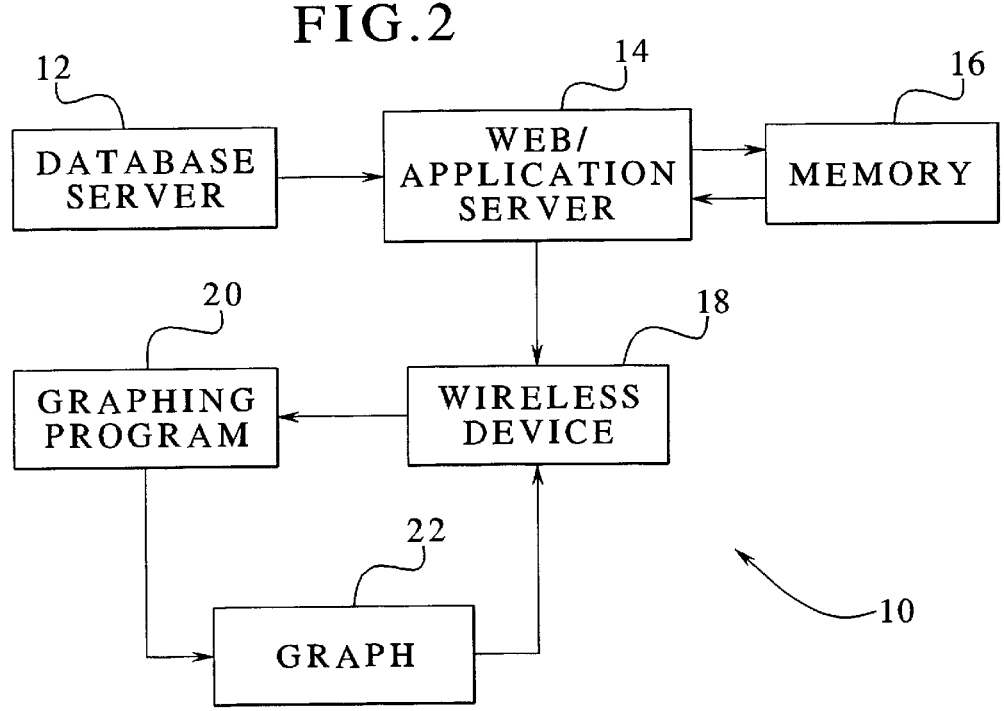
FIG. 2 illustrates a black box diagram of a system for the display of database information on a graph on a wireless device in an embodiment of the present invention.

Referring to FIG. 2, a black box diagram of an embodiment of a system 10 for the display of database information on a graph 22 or other format on, for example, a wireless device 18 is illustrated. Database information is displayed in a graph 22 or other format on a wireless device 18. The wireless device 18 of the present invention may query a database server 12 for data through a web or application server 14. Data may be retrieved from the database server 12 and stored in a memory 16 on the web or application server 14. When the data is returned as the result of a query, the data may be transferred to a graphing program 20. The graphing program 20, which preferably may be a native program on the wireless device 18 (typically written in C or C++ but may be written in any language), may take the data and may display the date in a graph 22 on a screen of the wireless device 18. The graph 22 may be a bar-chart, pie-chart, or in an other format determined by the user, the DBA or the like.

The query of the wireless device 18 may extend the basic functionality of wireless applications which cannot process and graph data. In an embodiment of the present invention, data may be retrieved from the database server 12, automatically input the same into the graphing program, computed, and displayed as a graph 22 on the wireless devices 18 for the user. The following illustration is an example of a bar chart displayed by the invention. The graph 22 is displayed, followed by the actual data upon which the graph 22 is based.

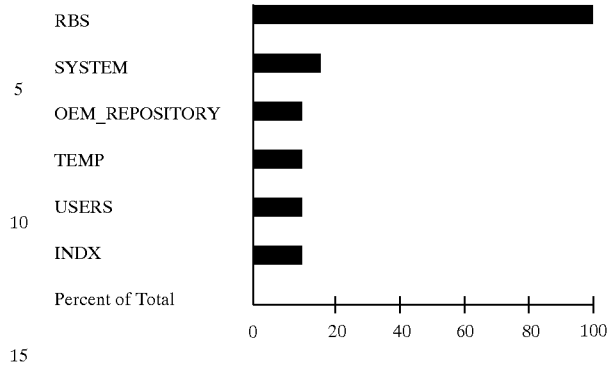

| | -Tablespace- | |
|---|---|---|
| Total Activity | Reads | Writes |
| -RBS- | | |
| 37 | 11 | 26 |
| -SYSTEM- | | |
| 1109 | 1093 | 16 |
| -OEM REPOSITORY- | | |
| 4 | 3 | 1 |
| -TEMP- | | |
| 4 | 3 | 1 |
| -USERS- | | |
| 4 | 3 | 1 |
| -INDX- | | |
| 4 | 3 | 1 |

The following illustration is an example of a pie-chart. Below is the percent of sorts in memory:

| Sorts of Memory | Sorts on disk | Total Rows |
|---|---|---|
| 798 | 84 | 11246 |

11% of Sorting was done in Memory

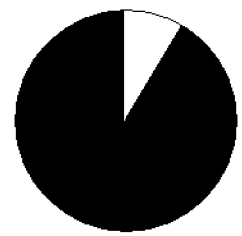

In another embodiment of the present invention, graphs 22 or other formats on the wireless device 18 may be auto-scaled. A graph 22 may have static or dynamic scales for an axis. For example, percentages always fall between 0 and 100 percent. Thus, a graph 22 of percentage, for example, always has the same X-axis scale. Other graphs 22, such as, for example, the size of objects, may vary depending upon the particular context for the data. For example, a table may vary from ten units to 1,000 units, 100,000 units, 100,000,000 units, or more.

When creating the graph 22 on the wireless device 18, the graphing program 20 may first decide to display data on a static axis or a dynamically scalable axis, such as, for example, an x-axis. In cases where the scale is static, such as the PERCENTAGE in the illustration above (which is always 0–100), no scaling is needed. If the scale were to change depending on the data, a formula may be applied to correlate the X-axis tick marks. The following chart shows data graphed where the largest data size (USERS) is 13.5 M. The present invention may receive all data and then determine that 15 M is the appropriate largest size of data for the X-Axis. The present invention may then determine the major "tick" points, which, in the case of the bar chart shown below are 3 M, 6 M, 9 M, and 12 M. The following are the total size of tablespaces:

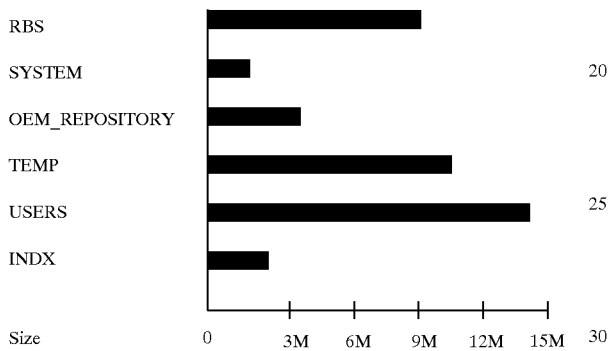

The following bar chart shows similar data graphed for a larger database, in which case the largest tablespace is 450 M, with the X-Axis scaled for 500 M. The following are the total size of tablespaces:

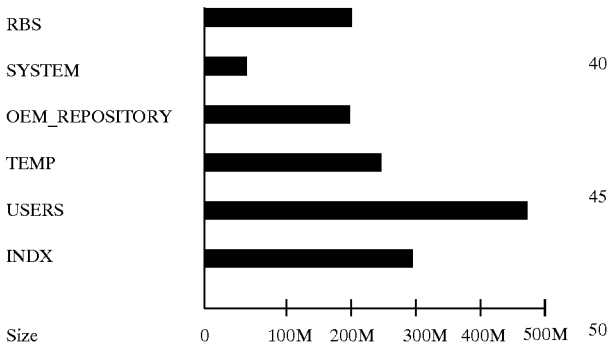

In this example, data of any size may be displayed on the handheld device.

Figure 3:
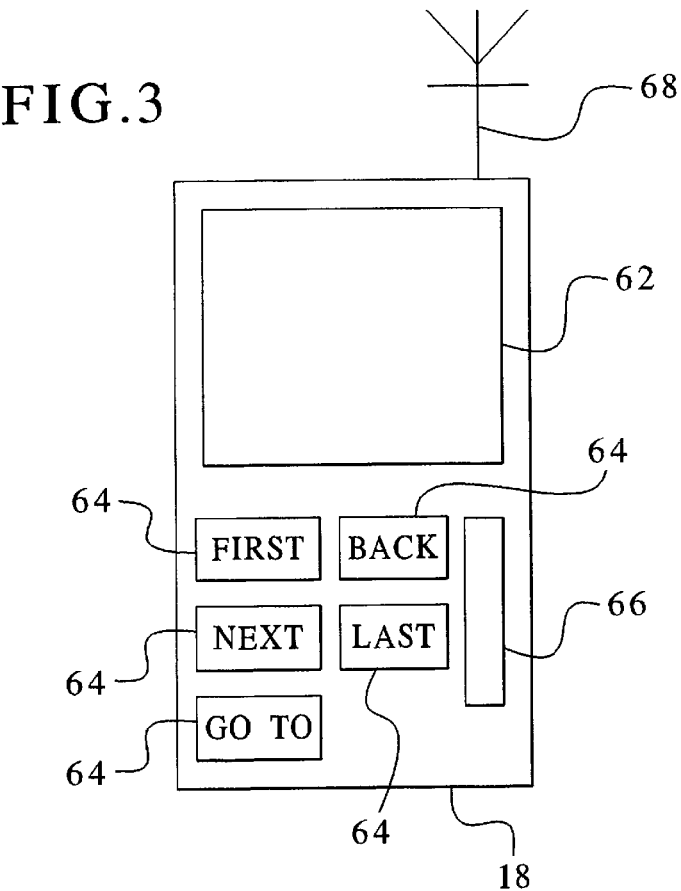
FIG. 3 illustrates a plan view of a wireless device in an embodiment of the present invention.

Referring now to FIG. 3, the wireless device 18 is generally illustrated. The wireless device 18 may have buttons 64, a scroll bar 66, a display means 62, and a wireless means 68 for accessing the web server 14. In the embodiment illustrated in FIG. 3, the wireless device 18 is a dedicated device manufactured as a tool for wireless communication for the monitoring and management of databases. Further, the wireless device 18, as illustrated, may be any handheld device capable of wireless communication, such as, for example, a Palm pilot, telephone, or the like.

It should be understood that various changes and modifications to the presently preferred embodiments described herein will be apparent to those skilled in the art. Such changes and modifications may be made without departing from the spirit and scope of the present invention and without diminishing its attendant advantages.

What is claimed is:

1. A method for wireless monitoring and management of databases wherein results are displayed on a wireless device, the method comprising the steps of:

receiving database information at the wireless device, and altering respective portions of the database information to represent respective altered database information for display at respective locations on a display of the wireless device based on respective sizes of the information represented by the respective portions and respective sizes of the respective locations; and displaying the altered database information on the display of the wireless device such that each of the respective altered information fits within its respective location on the display of the wireless device.

2. A method for formatting results on a screen of a wireless device, the method comprising the steps of:

querying data records from a database;

anticipating a number of the data records to be retrieved from the database;

retrieving the data records from the database;

storing the data records on a server;

choosing a threshold number;

determining if the data records retrieved from the database is greater than the threshold number; and displaying the data records at a display area on a display screen of the wireless device based on the results of the threshold comparison, the displaying including altering certain respective data records to represent respective altered data records for display at respective locations on the display screen of the wireless device based on respective sizes of the information represented by the respective portions and respective sizes of the respective locations.

3. The method of claim 2 wherein the displaying further comprises the step of:

displaying the data records not greater than the threshold number on a single screen of the display of the wireless device.

4. The method of claim 2 wherein the displaying further comprises the steps of:

breaking certain of the data records into portions;

wrapping each of the portions and displaying each of the wrapped portions at respective said locations on the display screen of the wireless device.

5. The method of claim 4 further comprising the step of:

determining a number of data records in each of the portions.

6. The method of claim 4 further comprising the step of:

navigating between each of the portions of data records.

7. The method of claim 2 further comprising the step of:

displaying a solid box enclosing the display area.

8. The method of claim 2 wherein for each data record, the displaying further comprises the steps of:

calculating a width in pixels of text in each data record;

computing a sum of the pixels;

calculating a width in pixels of a field in a respective said location in the display area;

entering the text on a first line of the field to the extent of the width in pixels of the text allowed in the width in pixels of the field in the display area; and entering the text on a second line of the field to the extent of the width in pixels of the text allowed in the width in pixels of the field in the display area.

9. The method of claim 2 further comprising the step of:

highlighting text from the data records within the display area.

10. The method of claim 2 further comprising the steps of:

inputting retrieved data into a graphing program; and displaying the data in a graph.

11. The method of claim 10 further comprising the step of:

displaying the data on an axis.

12. The method of claim 10 wherein the graph is a bar-chart.

13. A method for formatting results on a screen of a wireless device by breaking columns in a table, the method comprising the steps of:

comparing columns of text in the table;

determining how many columns to display horizontally to provide a best visual perception;

determining a width of each of the columns to display;

choosing break points in the table, and altering respective portions of the database information representing the table to represent an altered format table;

displaying the altered format table having the determined number of horizontally displayed columns, the determined widths of each of the columns and the chosen break points.

14. The method of claim 13 wherein the displaying further comprises the step of:

breaking columns with identical text by displaying the identical text on one line of the table.

15. The method of claim 13 further comprising the step of:

highlighting the text of the table.

16. The method of claim 13 further comprising the step of:

comparing a display order of data and a frequency of repetition for the columns in the table.

17. A method for formatting data records on a screen of a wireless device by using a scroll mechanism associated with the wireless device, the method comprising the steps of:

shifting the data records on the screen;

keeping the data records together on the screen; and locking one of the data records currently being displayed in a single area on the screen while shifting a remainder of the data records currently being displayed in the single area on the screen associated with the wireless device.

18. The method of claim 17 further comprising the step of:

highlighting a selection of the data records.

19. A system for monitoring and management of a database, the system comprising:

a wireless device having a screen and a wrapping means which determines respective sizes of respective portions of data in comparison to respective locations in which those respective portions are to be displayed on the screen, and alters the respective portions of data to represent respective altered information so that the respective altered information fit within their respective locations on the screen; and a server associated with the database wherein the wireless device remotely accesses the database to retrieve the data.

20. A system for formatting data query results stored in a database wherein the database has text of data defined by a plurality of characters wherein each of the plurality of characters is defined by a number of pixels, the system comprising:

a wireless device having means for retrieving the data query results;

a server having a memory associated with the server wherein the server has a means for remotely accessing the text data associated with the database and transferring the text of data to the wireless device; and the wireless device further having a display screen and a display controller which determines respective sizes of respective portions of the text data in comparison to respective locations in which those respective portions are to be displayed on the screen, and modifies the respective portions of text data so that the respective portions of the data fit within their respective locations.

21. A system for formatting results on a screen of a wireless device, the system comprising:

a database with text of data defined by tables having columns; and a server in remote communication with the wireless device wherein the server determines a width of the columns, chooses the columns having an identical text and breaks the columns with the identical text by altering respective portions of the data to represent respective altered data so that the columns are displayable on a single display screen.

22. The system of claim 21 further comprising:

means for highlighting the text of data.

23. The system of claim 21 further comprising:

means for comparing a display order of the text of data; and means for comparing a frequency of repetition for the columns in the table of the text of data.

24. A system for formatting data records on a wireless device, the system comprising:

a screen; and a scrolling mechanism for shifting the data records on the screen wherein the scrolling mechanism keeps each of the data records together in a single display area on the screen and locks one of the data records currently being displayed in the single display area while shifting a remainder of the data records currently being displayed in the single display area on the screen.

25. The system of claim 24 further comprising:

means for highlighting the data records.

26. An apparatus for monitoring and management of a database, the apparatus comprising:

a wireless means providing remote access to a server wherein the wireless means queries data records from the server wherein the server is associated with the database and further wherein the wireless means anticipates a number of data records to be retrieved from the database;

means for choosing a threshold number;

means for retrieving the data records from the database;

means for comparing a number of the retrieved data records to the threshold number; and means for displaying the data records on a display screen of the wireless means based on the results of the threshold comparison, wherein the means for displaying is associated with the wireless means and operates to alter certain respective data records to represent respective altered data records for display at respective locations on the display screen of the wireless means based on respective sizes of the information represented by the respective portions and respective sizes of the respective locations.

27. The apparatus of claim 26 further comprising:

means for highlighting the data records.

28. The apparatus of claim 26 further comprising:

means for navigating between each of the data records.

29. A method for wireless monitoring and management of a system selected from the group comprising a network system, a computer system a software system, or a database, wherein information from the system is displayed on a wireless device, the method comprising the steps of:

formatting information from the system for display on a screen of the wireless device by altering respective portions of the information to represent respective altered portions of information for display at respective locations on the display screen of the wireless device based on respective sizes of the information represented by the respective portions and respective sizes of the respective locations;

displaying the information in a predetermined format on the screen by wrapping portions of the information and so that all of the information fits within respective designated locations on the screen; and browsing on the wireless device between portions of the information.

30. A method for formatting information on a screen of a wireless device, the method comprising the steps of:

querying a system for information;

anticipating a volume of information to be retrieved from the database;

retrieving the information from the system;

storing the information on a server;

choosing a threshold volume of information;

determining if the volume of information retrieved from the system is greater than the threshold; and displaying the information at a display area on the screen of the wireless device based on the results of the threshold comparison, the displaying including altering respective portions of the information to represent respective altered portions of information for display at respective locations on the screen of the wireless device based on respective sizes of the information represented by the respective portions and respective sizes of the respective locations.

31. The method of claim 30 wherein the displaying further comprises the steps of:

displaying a subset of the information having a volume not greater than the threshold corresponding to a single screen of the wireless device.

32. The method of claim 30 wherein the displaying further comprises the steps of:

breaking the information into subsets;

wrapping each of the subsets and displaying each of the wrapped subsets at respective said locations on the display screen of the wireless device.

33. The method of claim 32 further comprising the step of:

determining a volume of information in each of the subsets.

34. The method of claim 32 further comprising the step of:

navigating between each of the subsets of information.

35. The method of claim 30 wherein the displaying further comprises the steps of:

displaying a solid box enclosing the display area.

36. The method of claim 30 further comprising the step of:

highlighting text from the information records within the display area.

37. The method of claim 30 further comprising the steps of:

inputting retrieved information data into a graphing program; and displaying the data in a graph.

38. The method of claim 37 further comprising the step of:

displaying the information on an axis.

39. The method of claim 37 wherein the graph is a bar-chart.

40. A method for formatting information on a screen of a wireless device by using a scroll mechanism associated with the wireless device, the method comprising the steps of:

shifting the information on the screen;

keeping the information together on the screen; and locking a subset of the information currently being displayed in a single area on the screen while shifting a remainder of the information currently being displayed in the single area on the screen associated with the wireless device.

41. The method of claim 40 further comprising the step of:

highlighting a selection of the information.

42. A system for formatting information on a wireless device, the system comprising:

a screen; and a scrolling mechanism for shifting a first subset of the information currently being displayed in a single area on the screen wherein the scrolling mechanism keeps the information of the first subset together and locks a second subset of the information currently being displayed in the single area on the screen while shifting a remainder of the first subset of information on the screen.

43. The system of claim 42 further comprising:

means for highlighting a portion of the information.

44. An apparatus for monitoring and management information from a system, the apparatus comprising:

a wireless means providing remote access to a server wherein the wireless means queries information from the server wherein the server is associated with the system and further wherein the wireless means anticipates a volume of information to be retrieved from the system;

means for choosing a threshold volume of information;

means for retrieving the information from the system;

means for comparing a volume of information to the threshold volume of information; and means, associated with the wireless means, for displaying the information on a display screen of the wireless means based on the results of the threshold comparison, the displaying including altering respective portions of the information to represent respective altered portions of information for display at respective locations on the screen of the wireless means based on respective sizes of the information represented by the respective portions and respective sizes of the respective locations.

45. The apparatus of claim 44 further comprising:

means for highlighting the information.

46. The apparatus of claim 44 further comprising:

means for navigating between portions of the information.

* * * * *